US012578736B1

(12) United States Patent
Jimenez

(10) Patent No.: US 12,578,736 B1
(45) Date of Patent: Mar. 17, 2026

(54) PLANNING OF UNMANNED UNDERWATER VEHICLE SURFACING EVENTS

(71) Applicant: United States of America as represented by the Secretary of the Navy, Arlington, VA (US)

(72) Inventor: Jorge G Jimenez, Panama City, FL (US)

(73) Assignee: The United States of America as represented by the Secretary of the Navy

( * ) Notice: Subject to any disclaimer, the term of this patent is extended or adjusted under 35 U.S.C. 154(b) by 133 days.

Patent file contains an affidavit/declaration under 37 CFR 1.130(b).

(21) Appl. No.: 18/423,418

(22) Filed: Jan. 26, 2024

(51) Int. Cl.
| | |
|---|---|
| *G05D 1/644* | (2024.01) |
| *G05D 1/633* | (2024.01) |
| *G05D 101/15* | (2024.01) |
| *G05D 107/00* | (2024.01) |
| *G05D 107/13* | (2024.01) |
| *G05D 109/30* | (2024.01) |
| *G05D 111/50* | (2024.01) |

(52) U.S. Cl.
CPC ............. *G05D 1/644* (2024.01); *G05D 1/633* (2024.01); *G05D 2101/15* (2024.01); *G05D 2107/13* (2024.01); *G05D 2107/27* (2024.01); *G05D 2109/38* (2024.01); *G05D 2111/52* (2024.01)

(58) Field of Classification Search
None
See application file for complete search history.

(56) References Cited

U.S. PATENT DOCUMENTS 11,958,579 B2 * 4/2024 Englot .................... G01S 15/89

OTHER PUBLICATIONS

N. Abreu, N. Cruz and A. Matos, "Accounting for uncertainty in search operations using AUVs," 2017 IEEE Underwater Technology (UT), Busan, Korea (South), 2017, pp. 1-8, doi: 10.1109/UT.2017.7890326. (Year: 2017).*
A. A. Pereira, J. Binney, B. H. Jones, M. Ragan and G. S. Sukhatme, "Toward risk aware mission planning for Autonomous Underwater Vehicles," 2011 IEEE/RSJ International Conference on Intelligent Robots and Systems, San Francisco, CA, USA, 2011 , pp. 3147-3153, doi: 10.1109/IROS.2011.6095157. (Year: 2011).*

* cited by examiner

*Primary Examiner* — Jelani A Smith
*Assistant Examiner* — Davin Seol
(74) *Attorney, Agent, or Firm* — James M Kasischke; Jeffrey C. Severson

(57) ABSTRACT

Methods and systems are provided for planning locations to surface an unmanned underwater vehicle (UUV) to reset inertial navigation errors by obtaining a GPS fix. A spatial point process model for historical maritime traffic is used to quantify surfacing risk throughout an operational area. Accumulated navigation uncertainty for each candidate surfacing point of a feasible path is modeled and penalized. This allows autonomy to balance the tradeoff between surfacing risk, navigation performance and pathlength. The planning method results in minimizing the path length the UUV travels and the number of times the UUV surfaces, while satisfying a defined constraint on maximum allowable risk.

17 Claims, 5 Drawing Sheets

10

INTENSITY

HIGH                                                    LOW

100

PLANNING OF UNMANNED UNDERWATER VEHICLE SURFACING EVENTS

STATEMENT OF GOVERNMENT INTEREST

The invention described herein may be manufactured and used by or for the Government of the United States of America for governmental purposes without the payment of any royalties.

BACKGROUND OF THE INVENTION

(1) Field of the Invention

The present invention relates to navigation of Unmanned Underwater Vehicles (UUVs). More particularly, the present invention relates to planning locations to surface an UUV to reset inertial navigation errors by obtaining a Global Positioning System (GPS) fix.

(2) Description of the Prior Art

UUVs often use inertial navigation systems (INS) to estimate their location while submerged. Commercial INS are typically rated to a maximum error-rate and vehicles periodically surface to reset accumulating localization error. However, ad-hoc surfacing may lead to vehicles surfacing in regions with significant maritime traffic, which increases the risk of mission failure via collision with surface vessels.

An ideal surfacing planner minimizes the number of times the UUV surfaces subject to acceptable navigation performance. In particular, surfacing needs to be minimized where frequent surfacing is not feasible, such as when traversing high risk or high maritime traffic regions. As the decision to surface is deferred, navigation uncertainty increases, and the knowledge of UUV position in the environment degrades.

Most known path-planning methods for UUVs optimize paths with respect to efficiency, obstacle avoidance and control. While generally considering the risks of shipping traffic and bathymetry, these methods do not explicitly address finding the safest possible path for the UUV. In coastal regions with high shipping traffic, reducing collision risk at the path planning stage, at the expense of efficiency, is a worthwhile trade-off.

In one known method, risk maps are built using historical data of shipping traffic from the Automated Identification System. Using available search algorithms, these maps can be used to plan minimum risk paths between a specified start and goal location, while avoiding other known obstacles. However, the path length is not explicitly considered when planning the minimum risk paths. Also, navigation or position uncertainty increases as path length increases. Thus, position uncertainty accumulates with each surfacing. Known methods do not incorporate this accumulating navigation uncertainty when planning the minimum risk paths.

What are needed are methods and systems for planning a mission path and planning locations along the planned path to surface an UUV to reset inertial navigation errors by obtaining a GPS fix. The path-planning methods and systems need to consider surface vessel traffic when planning the surfacing locations to mitigate the risk of a collision when surfacing. The methods and systems need to also consider path lengths while planning minimum risk paths. Further, the methods and systems need to incorporate accumulated navigation uncertainties for candidate surfacing points on a feasible path to balance surfacing risk, navigation performance, and pathlength.

SUMMARY OF THE INVENTION

It is therefore a general purpose and primary object of the present invention to provide methods and systems for planning a mission path and planning locations along the planned path to surface an UUV to reset inertial navigation system (INS) errors by obtaining a GPS fix. The methods and systems provide a map of maritime traffic intensity in the planned operational area for a user-specified time interval using data sets of historical maritime traffic from the Automatic Identification System (AIS).

Using the map, the methods and systems provide for accounting of surface vessel traffic in planning the surfacing locations to mitigate the risk of a collision when surfacing. Additionally, the methods and systems provide for incorporating the uncertainty in the state of the INS such that localization uncertainty induced risk is minimized when surfacing near high-intensity surface traffic regions.

The methods and systems use a spatial point process model for historical maritime traffic to quantify surfacing risk throughout the operational area. Thus, accumulated navigation uncertainty for each candidate surfacing point of a feasible path can be modeled and penalized. This allows autonomy to balance the tradeoff between surfacing risk, navigation performance, and pathlength. The methods and systems can result in minimizing the path length and the number of surfacings, while satisfying a constraint on maximum allowable risk.

The methods and systems model historical maritime traffic as a Poisson point process with a spatially varying intensity function and identify surfacing locations based on expected traffic. The methods and systems describe the void probability of a region of the operational area on which the Poisson process is defined as the probability that no vessels are in that region. Navigable locations with surrounding neighborhood void probability satisfying a predetermined threshold are identified as candidate surfacing locations. The methods and systems construct a directional graph using candidate surfacing locations as nodes and enumerate through all feasible paths from ingress to the goal to determine the best sequence of surfacing locations.

As described previously, in formulating the spatial point process model a map of maritime traffic intensity is created by collecting vessel counts in a fully navigable space for a user-specified time interval. Vessels at locations within the space are the points of the spatial process used to estimate the Poisson intensity function. The expected number of vessels in a neighborhood of the space in unit-time can be determined. If the UUV remains surfaced for a duration much less than the specified time interval, the probability that there are no vessels in the neighborhood for the duration of the surfacing, called the void probability, can also be determined.

As the probability of colliding with a vessel when surfaced in a neighborhood is proportional to the number of vessels in the neighborhood, the determined void probability quantifies the safety (inverse risk) of surfacing in any given neighborhood. A location in the space is considered a candidate surfacing location if the void probability in the neighborhood of a specified radius around the location is greater than a specified value, corresponding to a minimum value of acceptable risk. The collection of all candidate surfacing points including the ingress and goal are defined as the nodes of a directional graph.

As noted previously, the UUV is equipped with an inertial navigation system (INS) having a given performance typically expressed by the circular error probability (CEP) that specifies the radius of a circle where the probability of the UUV being in the circle is 50%. The CEP for submerged rectilinear transits at a constant velocity grows linearly with the distance from the last surfacing and can be written as a percentage of distance traveled.

Points in the space can be randomly displaced on the space to form a new, valid intensity function if the displacement of each point is independent and identically distributed (IID). Given the belief in the UUV state is characterized by a symmetric Gaussian, the uncertainty when surfacing at a next location is characterized by the covariance matrix. The approximated Gaussian is used as the probability density to iteratively displace the intensity as a function of accumulated state uncertainty. In doing so, the methods and systems influence surfacing risk as a function of state uncertainty.

The cost, or edge weight for traversing from a surfacing point to the next surfacing point is defined as the ratio between distance-traveled and void probability of the displaced intensity at the resulting surfacing node. The void probability in this cost is dependent on the distance, hence, accumulated uncertainty from the source node. This cost assignment is chosen for the edge weights of directional graph as the cost for equidistant path-segments is dependent on the diffused intensity around the subsequent surfacing location.

Let there be a collection of all feasible paths, where each feasible path in the collection is comprised of a sequence of surfacing locations on the way to the goal. The cumulative cost for each element in the collection can be computed and a feasible path can be discarded if for any surfacing location on that path, the void probability is less than the specified value.

The optimal path can be defined, with redundant/inefficient surfacing and repeatedly deferred surfacing being jointly penalized. Appending an additional surfacing point to the optimal path can result in a longer-duration path increasing risk exposure and potentially increasing cost. Likewise, removing a surfacing point from the optimal path can decrease the void probability (safety) of the surfacing point following the removed point via displacement, resulting in a (potentially significant) higher-cost path.

In one embodiment, a method of planning a mission path for an unmanned underwater vehicle (UUV) and surfacing locations along said mission path from a given ingress point to a given goal point within an operational area includes mapping surface vessel traffic intensity onto the operational area. The method identifies candidate surfacing locations based on locations on the map where a void probability that there are no surface vessels within a specified radius of the location while the UUV is surfaced for a specified duration is not less than a specified minimum safety value. The method forms a directional graph of the candidate surfacing locations.

For each leg of each possible path through the candidate surfacing locations, the method determines a displacement of the traffic intensity based on an uncertainty in a state of an internal navigation system (INS) of the UUV over a distance traveled in the leg. Also, for each said leg, the method determines a diminution in the void probability based on the displacement. For each possible path, the method determines a cumulative cost of each leg in the path based on the distance traveled and the diminution in the void probability. The method then determines an optimum path out of all possible paths based on the optimum path having a minimum cumulative cost.

The method further includes discarding a possible path when the void probability at one of the surfacing locations on the path is less than the minimum safety value. Further, mapping includes estimating a Poisson intensity function based on a spatial point process of points in the operational area where the surface vessels are located. Also, determining the optimum path includes discarding a possible path when a cumulative cost of the possible path exceeds a cumulative cost of a previous possible path.

A belief in the state of the (INS) is characterized by a symmetric Gaussian and the uncertainty is characterized by a covariance matrix. Determining the displacement includes using the Gaussian as a probability density to displace the traffic intensity as a function of accumulated uncertainty in the state. Determining the cost includes determining an edge weight of the directional graph with the displacement for traversing each leg as a ratio between the distance traveled and the probability based on the displaced traffic intensity.

In one embodiment, a method of planning a path and surfacing locations for an UUV in an operational area between an ingress point to a goal point includes iteratively accumulating navigation uncertainty in a state of the INS of the UUV over each leg of the path between surfacing locations. An increase in the navigation uncertainty increases a cost associated with a risk of surfacing at a location with an elevated risk of collision with surface vessels. Additionally, an optimum path can be determined based on the optimum path satisfying specified constraints on the risk of surfacing and minimizing the cost. Minimizing the cost minimizes the number of surfacing locations and minimizes the distance traveled between the ingress point and the goal point.

The method includes specifying a safety radius about the UUV when surfaced, specifying a duration the unmanned underwater vehicle remains surfaced and defining a void probability as a probability that there are no surface vessels within the specified radius of a location while the unmanned underwater vehicle is surfaced for the specified duration, with the void probability being inverse to the risk of surfacing. Additionally, the risk of surfacing is constrained to a specified maximum value and candidate surfacing locations can be identified as locations where the risk of surfacing is not greater than the specified maximum value. All possible paths include each possible path through the candidate surfacing locations.

Identifying candidate surfacing locations further includes obtaining the void probability from an estimated Poisson function of traffic intensity over the operational area based on a spatial point process of points in the operational area where the surface vessels are located. Additionally, iteratively accumulating can further include determining a displacement of the traffic intensity for each leg of each possible path based on the navigation uncertainty over a distance traveled in each leg and determining said cost based on the displacement.

The cost can be defined as a ratio between a distance traveled in each leg and the void probability of the displaced traffic density at the end of the leg. Possible paths can be discarded when the void probability at one of the surfacing locations on the path exceeds the maximum value for the risk.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like references numerals and symbols designate identical or corresponding parts throughout the several views and wherein.

DESCRIPTION OF THE INVENTION

Figure 1:
FIG. 1 is a simplified illustration of an operational area for an unmanned underwater vehicle (UUV)
Figure 1:
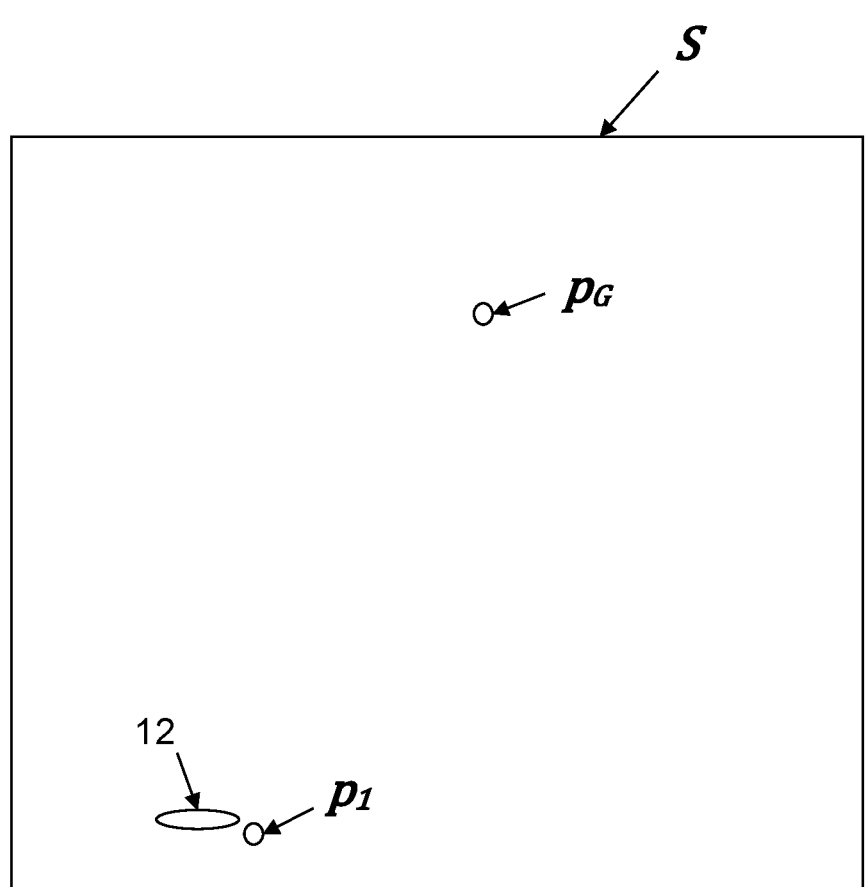

Referring now to FIG. 1, there is shown a simplified illustration of operational area S for unmanned underwater vehicle (UUV) 12. Area S is a fully navigable area with spatially varying maritime traffic. UUV 12 is tasked to transit from ingress point $p_1$ to a goal $p_G$. UUV 12 state uncertainty accumulates when submerged and vehicle 12 must surface along the way to goal $p_G$ to reset any localization error. Surfacing should occur in locations with minimal collision risk and account for UUV 12 state uncertainty to minimize the discrepancy between planned and actual surfacing locations, as any discrepancy may potentially result in surfacing in a high-risk region.

Figure 2:
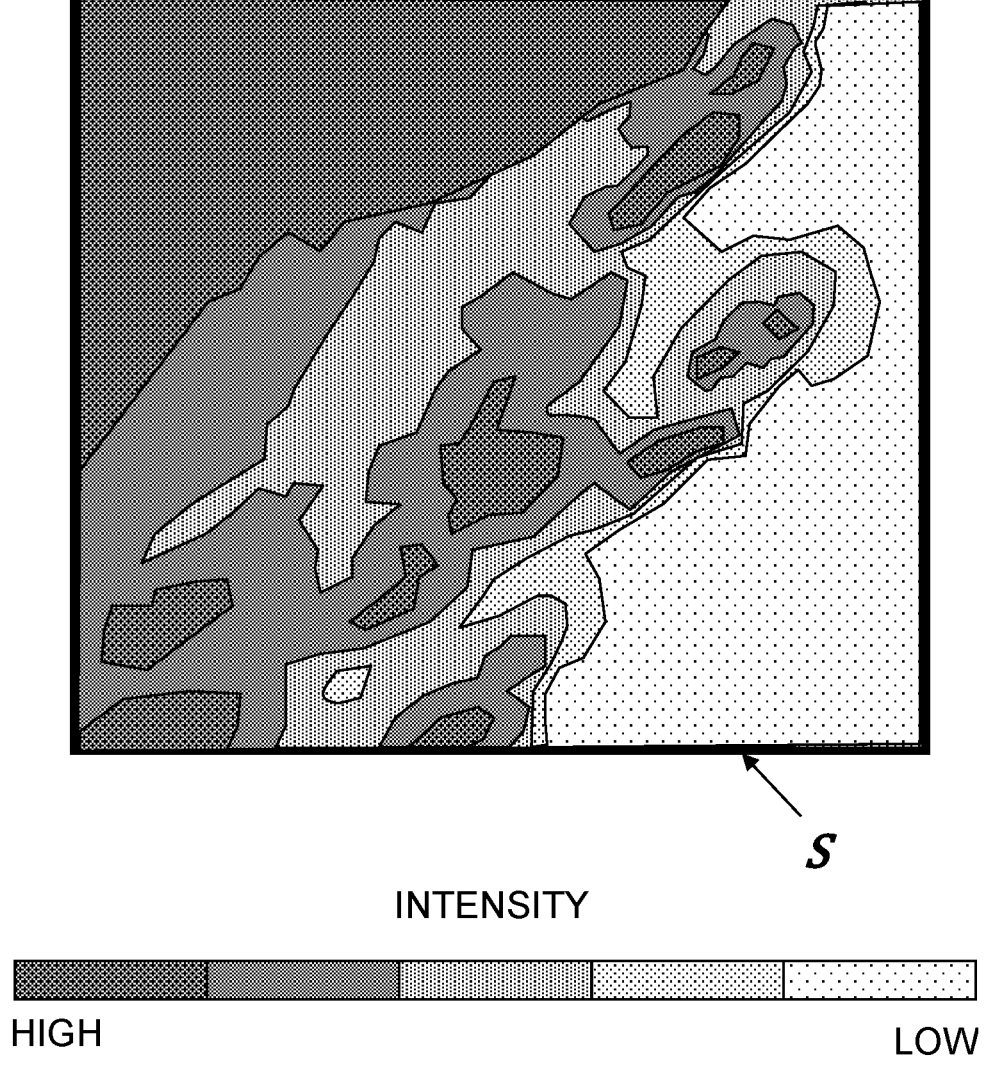
FIG. 2 is a simplified illustration of the operational area of FIG. 1 showing surface traffic intensity.

Referring now also to FIG. 2, there is shown surface traffic intensity mapped onto area S. The mapping of maritime traffic intensity can be created by collecting vessel counts in S for a user-specified time interval $T_{int}$ (e.g., day, month, year). Datasets of historical maritime traffic are readily available from the Automatic Identification System (AIS), which monitors automatic identification and location messages of vessels. Vessels located at $s \in S$ are the points of our spatial process that are used to estimate the Poisson intensity function $\lambda : S \rightarrow [0, \infty)$. For simplification, but not limitation, only five different intensities are shown in FIG. 2. It will be understood by those in the art that the mapping will result in a continuous gradient of all intensities. Tools for fitting estimated intensities are well known in the art.

The expected number of vessels on a (Euclidian) neighborhood $B \subset S$ in unit-time is $$N_B = \frac{1}{T} \int_B \lambda(s) ds. \qquad (1)$$

A Poisson process is characterized with the property that the probability of $N_B = n$, for $n \in \mathbb{N} \cup \{0\}$, is Poisson distributed $$Pr[N_B = n] = \frac{(N_B)^n}{n!} e^{-N_B}. \qquad (2)$$

Assuming UUV 12 will remain surfaced for a duration $T \ll T_{int}$, the probability that there are no vessels in B for duration T is the so-called void probability $$v(B,T) = Pr[N_{B,T} = 0] = e^{-N_B T}. \qquad (3)$$

The probability of colliding with a vessel when surfaced in B is proportional to the number of vessels in B. Therefore, equation (3) is adopted to quantifying the safety (inverse risk) of surfacing in any given neighborhood. A value of $v(.,T) = 1$ corresponds to the minimum risk at the surface and $v(.,T) = 0$ corresponds to the highest risk.

As is known in the art, points in S can be randomly displaced on S to form a new, valid intensity function if the displacement of each point is independent and identically distributed (IID). Specifically, let $\rho(s|s')$ be the IID probability distribution characterizing the stochastic displacement for a point at s. The new point process is Poisson with intensity $$\lambda(s) = \int_S \lambda(s') \rho(s|s') ds'. \qquad (4)$$

Intensity displacement is used herein to establish functional dependence between UUV 12 state uncertainty and $v(B,T)$ to model the degradation of position information in the environment and penalize repeated deferred surfacing. Safety is distinguished with respect to a displaced intensity function as $\tilde{v}(.,T)$. In choosing candidate locations for surfacing UUV 12, redundant/inefficient surfacing is penalized so as to minimize the number of times a vehicle must surface. Additionally and jointly, repeatedly deferred surfacing leading to undesired navigation performance also is penalized.

Figure 3:
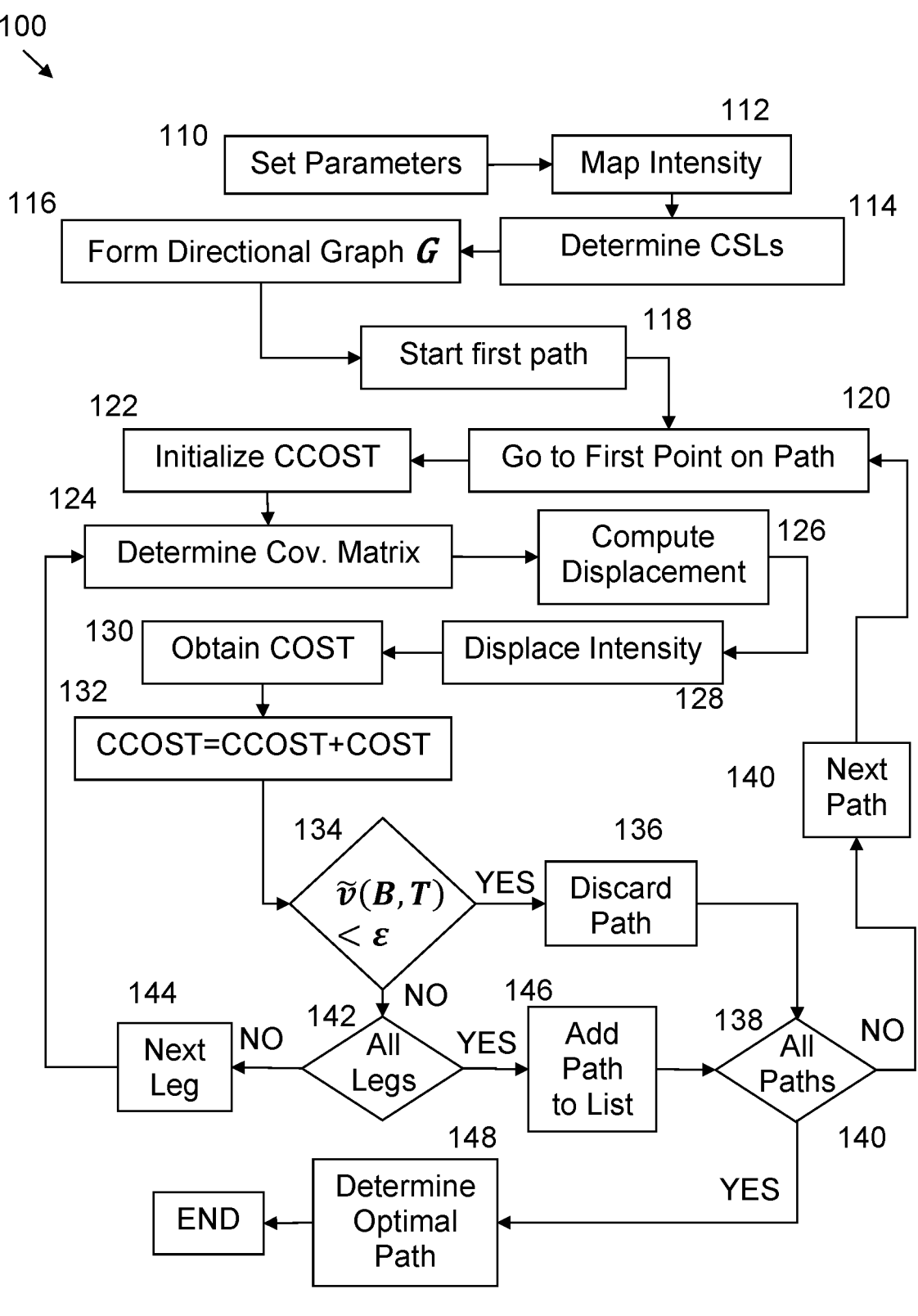
FIG. 3 illustrates a schematic block diagram of a method for planning surfacing locations along a route for an UUV.

Referring now also to FIG. 3, there is illustrated a schematic block diagram of method 100 for planning surfacing locations along a route for UUV 12. Method 100 begins at block 110 with the user specifying the parameters for the route mapping. The parameters will include operational and performance standards for UUV 12, such as the time T spent at a surfacing location and safety standards for the route to be chosen. These inputs are described further hereinafter. With the parameters set, block 112 of method 100 maps the intensity onto the operational area S as discussed hereinbefore. A location $p_i \in S$, $i \in \mathbb{N}$, is a candidate surfacing location (CSL) if the void probability in the neighborhood of radius r around it, $B_i$, satisfies $$v(B_i, T) \geq \varepsilon, \qquad (5)$$

for user-specified r, $\varepsilon > 0$, as input at block 110. Using Eq. 5, block 114 determines all the CSLs throughout area S. It is noted that the intensity for identifying candidate surfacing points in Eq. (5) is with respect to the original, un-displaced intensity. The collection of all candidate surfacing points, including the ingress and goal, are defined as the nodes of a directional graph G at block 116.

As noted hereinbefore, method 100 incorporates navigation uncertainty in determining the optimal path and surfacing locations for UUV 12. To do so, it is recognized that UUV 12 is equipped with an inertial navigation system (INS) that incorporates information from various sensors such as accelerometers, gyros and velocity to estimate the vehicle state (i.e., position, velocity, attitude) and uncertainty while submerged. The performance of an INS can be typically expressed by the circular error probability (CEP) rating that specifies the radius of a circle where the probability of UUV 12 being in the circle is 50%.

The CEP for submerged rectilinear transits at a constant velocity grows linearly with the distance from the last surfacing and can be written as a percentage $\phi$ of distance traveled. Accordingly, the CEP radius for a traverse of $\delta$ km is $\delta \cdot \phi$. The value of $\phi$ in sub-sea applications is typically near 0.1% but can exceed 2%. Thus $\phi$, as input at block 110, is

7 significantly dependent on the quality of inertial sensors and whether velocity measurements are taken relative to the sea floor.

The CEP radius for traversing a path-segment between candidate surfacing point $p_i$ to the next surfacing point $p_i+1$, is $\phi \cdot d(p_i, p_{i+1})$, where $d(\bullet, \bullet)$ is the distance between the two locations. The known conversion from CEP radius to standard deviation is $\sigma_{i,i+1}$ $(0.849\phi \cdot d(p_i, p_{i+1}))$. It is taken that the belief in the state of UUV 12 is characterized by a symmetric Gaussian. Thus, the uncertainty when surfacing at $p_i+1$ is characterized by the covariance matrix $$\Sigma = \text{diag}[\sigma_{i,i+1}{}^2, \sigma_{i,i+1}{}^2]. \tag{6}$$

The approximated Gaussian is used as the probability density to iteratively displace the intensity as in Eq. (4) as a function of accumulated state uncertainty. Hence, it can be taken that $\rho(s|s') \equiv N(s, \Sigma|s')$. In doing so, method 100 influences the surfacing risk as a function of state uncertainty.

The cost (edge weight) for traversing from a surfacing point $p_i$ to the next surfacing point $p_{i+1}$ is defined as the ratio between distance-traveled and void probability of the displaced intensity at the resulting surfacing node, $d(p_i,p_{i+1})/\tilde{v}$ $(B_{i+1},T)$. The void probability in the cost of method 100 is dependent on the distance, hence, accumulated uncertainty from the source node, i.e., $\tilde{v}(B_{i+1},T) = \tilde{v}(B_{i+1},T|p_i)$. For simplicity, but not limitation, dependence on the specific $p_i$ is omitted.

This cost assignment for the edge weights of G is chosen since the cost for equidistant path-segments is dependent on the diffused intensity around the subsequent surfacing location. It can be noted that the cost function herein can be interpreted as the ratio between accumulated state uncertainty and uncertainty-conditioned safety because uncertainty is proportional to distance-traveled.

Let $\mathcal{B} = \{\mathcal{P}_1, \ldots, \mathcal{P}_{|\mathcal{B}|}\}$ be the collection of all feasible paths, where $\mathcal{P}_i \in \mathcal{B}$ is comprised of a sequence of candidate surfacing locations on the way to the goal. Starting with the first path in the set (block 118) and at the ingress, or first point of each path (block 120), the cumulative cost CCOST is initialized (block 122). Using Eq. 6, method 100 computes the covariance matrix (block 124) for the next leg of the path. At block 126, intensity displacement is computed for this leg or pair of sequential candidate locations by convolving the intensity with a Gaussian kernel with uncertainty as in Eq. (6). Block 128 uses the approximated Gaussian as the probability density to displace the intensity as in Eq. (4).

At block 130, the cost (edge weight of the displaced directional graph G) for traversing from a surfacing point $p_i$ to the next surfacing point $p_{i+1}$ is obtained as described hereinbefore. This cost (COST) is added to the cumulative cost (CCOST) to obtain a new cumulative cost (CCOST) at block 132. If, at block 134, for $p \in \mathcal{P}_i$, $\tilde{v}(B,T) < \epsilon$, then the path $\mathcal{P}_i$ is discarded (block 136).

Method 100 then checks if all paths have been completed (block 138). If not, method 100 proceeds to the next path in the set (block 140), returning to block 120 to begin at the first point of the next path. If the path is not discarded, block 142 checks if all legs of the path are completed. If not, method 100 proceeds to the next leg (block 144) and returns to determine the covariance at block 124. If the path is complete, method 100 adds the completed path to a list of completed paths (block 146) and then returns to block 138 to determine if all paths have been completed. If all paths are complete, then the optimal path is determined at block 148 from

8

$$\mathcal{P}^* = \min_{\mathcal{P} \in \mathcal{B}}(|\mathcal{P}| - 1)\sum_{i=1}^{|\mathcal{P}|-1} \frac{d(p_i, p_{i+1})}{\tilde{v}(B_{i+1}, T)}, \tag{7}$$

based on all possible paths from the list of paths and method 100 ends.

Eq. (7) chooses the path that minimizes the number of surfacings and travel distance that satisfies the user constraint on risk from Eq. 5. Non-optimal paths may have less overall risk but would have more surfacings and longer travel distance. It is noted that more surfacings inherently increases the odds of collision. Redundant/inefficient surfacing and repeatedly deferred surfacing are jointly penalized in Eq. (7). Appending an additional surfacing point to the optimal path results in a longer-duration path, which increases risk exposure and potentially increases cost. Likewise, removing a surfacing point from the optimal path decreases the void probability (safety) of the surfacing point following the removed point via displacement, resulting in a (potentially significant) higher cost path.

Figures 4A, 4B:
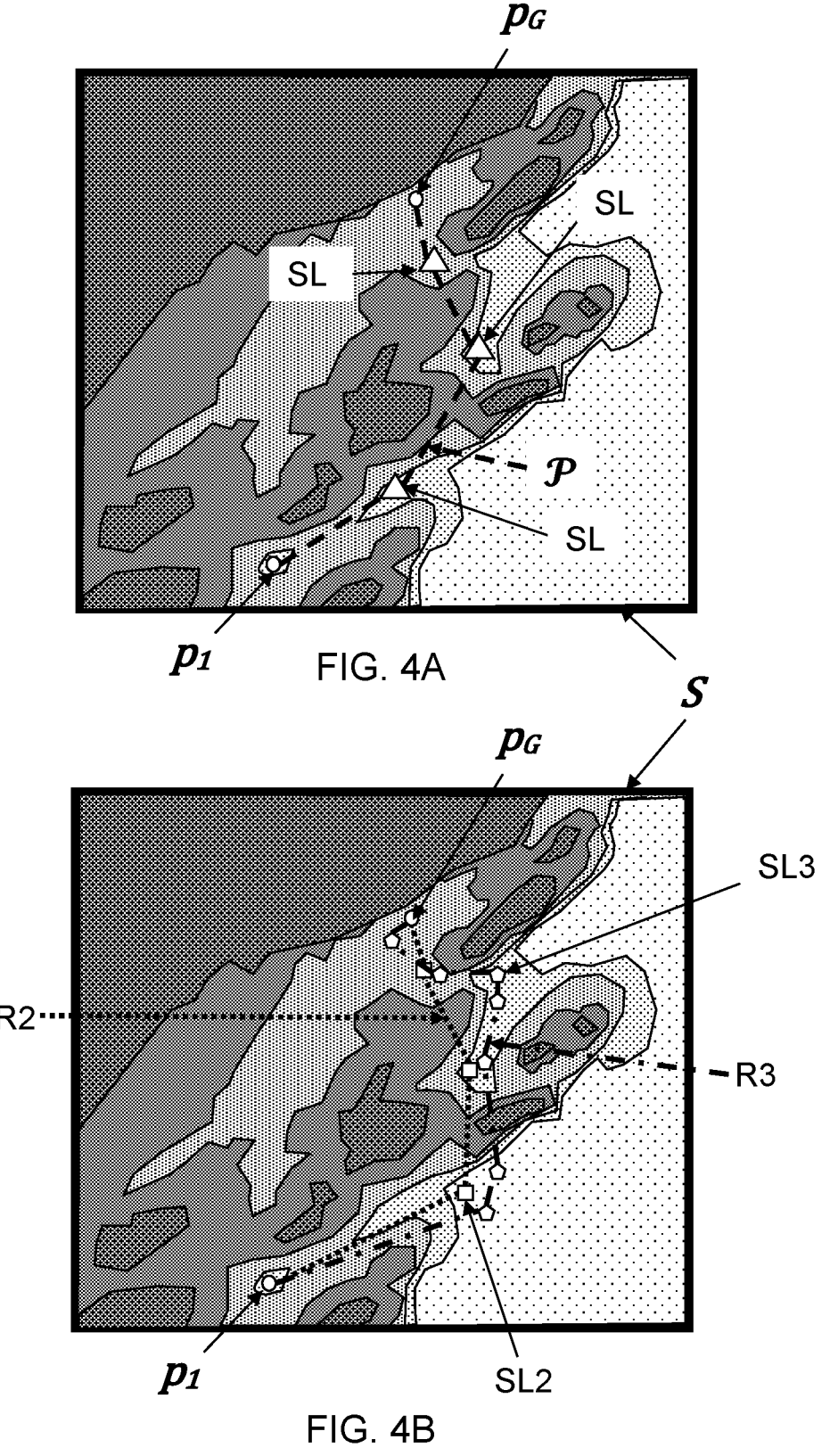
FIG. 4A and FIG. 4B are simplified illustrations of the operational area of FIG. 2 showing planned paths using the method of FIG. 3 with varying parameters.

Referring now to FIG. 4A, there is shown a simplified illustration of the use of method 100 to plan a path through a 150 km×150 km operational area S. The ingress location $p_1$ and goal location $p_G$ of FIG. 1, as well as the surface traffic intensity of FIG. 2 are also indicated in FIG. 4A. The planned path, designated as dotted line $\mathcal{P}$, includes three surfacing locations, designated by triangles SL.

As ingress $p_1$ and goal location $p_G$ are somewhat close, a typical high-end INS with a CEP of 0.1% would surface at most once. Accordingly, much higher values of $\phi$ can be chosen for illustration purposes. For the illustration of FIG. 4A, the input parameters were as follows:

| PARAMETER | | VALUE |
|---|---|---|
| Neighborhood radius | r = 0.5 | A minimum safe distance to any vessel (km) |
| Void probability threshold | $\epsilon$ = 0.7 | Threshold on maximum allowable surfacing risk |
| Navigation CEP | $\phi$ = 5% | Inertial Navigation System performance specification |
| Surface time | T = 5 | Expected time duration on the surface (minutes) |

The void probability $\epsilon$=0.7 corresponds to an expected 0.36 vessels in the neighborhood for the T=5-minute duration at the surface.

The effect of the circular error probability (CEP), $\phi$, on the planned route is shown in comparing FIG. 4A and FIG. 4B. FIG. 4B illustrates two planned routes shown by dotted line R2 with surfacing locations designated by rectangles, and dash-dot line R3 with surfacing locations designated by pentagons. For clarity, only one of each of R2 and R3 surfacing points is labeled in FIG. 4B, as SL2 and SL3, respectively. The path characteristics for each path are as follows:

| Route | $\phi$ | Number of Surfacings | Distance Traveled (km) |
|---|---|---|---|
| $\mathcal{P}$ | 5% | 3 | 136.40 |
| R2 | 10% | 3 | 143.87 |
| R3 | 20% | 7 | 159.69 |

The behavior of method 100 is shown to increase the traverse distance to the first surfacing point for higher values of $\phi$ in order to surface in a region with lower maritime traffic. Furthermore, the ɸ=20% implementation of method 100 is seen to select successive surfacings prior to a traverse through and near regions with high maritime traffic intensity. The successive surfacings reduce the uncertainty when surfacing at subsequent locations that are surrounded by high-risk regions. As seen in FIG. 4B, the pattern of successive surfacings is repeated as UUV 12 approaches goal $p_G$.

Also, for UUVs with inertial navigation systems having high values of the CEP, method 100 may fail to find a path. Options for such a case are to decrease the safety threshold ε, reduce the neighborhood radius r over which surfacing risk is evaluated or any combination of both. Reducing the parameters increases the number of candidate surfacing locations and reduces the number of discarded feasible paths.

When compared to method 100, previous surfacing location route planning methods are shown to select conservative paths to goal $p_G$ and to avoid traversing through regions with elevated risk. This conservative tendency of previous methods may result in on-average lower risk paths when compared to method 100. However, the maximum risk of previous methods exceeds that of method 100 since surfacing locations need not satisfy a threshold on risk/safety. Likewise, path length and number of surfacings of previous methods are generally higher than that of method 100, and sometimes significantly higher.

What has thus been described are methods and systems for planning an UUV mission path from a given ingress point to a given goal point. The methods and systems include planning locations along the planned path for the UUV to surface to obtain a GPS fix to reset inertial navigation system errors. In choosing surfacing locations, the methods and systems mitigate the risk of a collision with surface vessels when surfacing. Additionally, the methods and systems provide for incorporating the uncertainty in the state of the INS such that localization uncertainty induced risk is minimized when surfacing near high-intensity surface traffic regions.

The intensity on surface ship traffic is mapped onto the operational area S using a spatial point process model for historical maritime traffic to quantify surfacing risk throughout the operational area. Candidate surfacing locations (CSLs) are determined based on a location exceeding a specified safety threshold for surfacing risk. The collection of all CSLs is defined as the nodes of a directional graph G.

For each leg of each possible path through the CSLs an intensity displacement is determined based on the uncertainty in the state of the INS for that leg. The displaced intensity is mapped onto the operational area and the cost in terms of decreased safety in surfacing is computed. If for any leg the surfacing risk falls beneath the safety threshold, the current possible path is discarded and the next path is investigated. When all paths have been investigated, the optimal path is chosen based on Eq. 7.

Obviously, many modifications and variations of the present invention may become apparent in light of the above teachings. For example, an exhaustive search can be used to find the optimal path when the operational area is sufficiently small. Other methods known in the art can be used for determining the optimal path given the determination of edge weights described herein.

Figure 5:
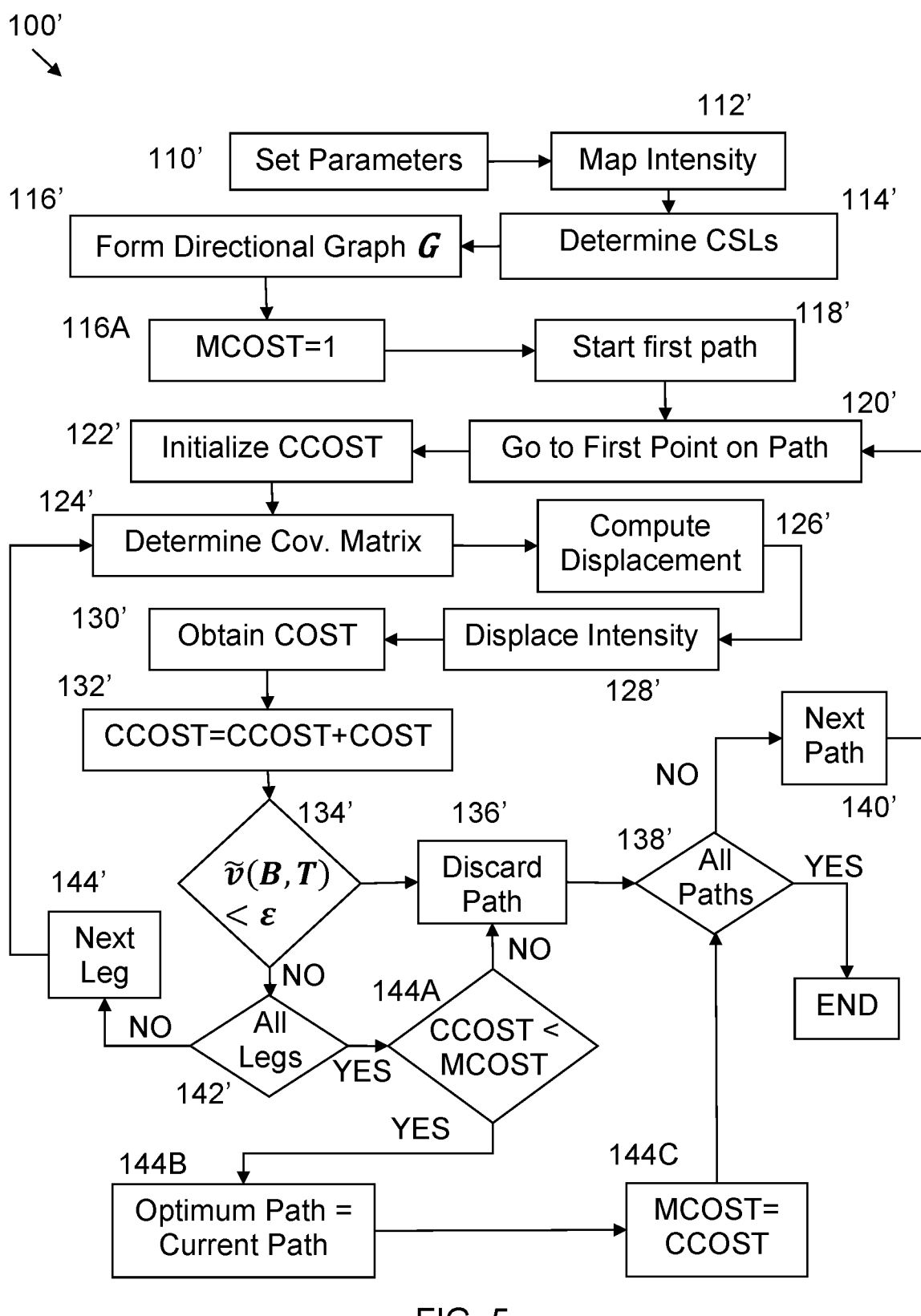
FIG. 5 illustrates a schematic block diagram of an alternate method for planning surfacing locations along a route for an UUV.

As another example, the configuration of blocks in method 100 can be changed to suit processing capabilities used in executing method 100. Referring now also to FIG. 5, there is illustrated a block diagram of alternative method 100' for determining the optimum path for UUV 12. Blocks in method 100' corresponding to like blocks in method 100 are shown as primed, e.g., block 122' (Initialize CCOST) of FIG. 5 corresponds to block 122 (Initialize CCOST) of FIG. 3.

Method 100' proceeds through blocks 110'-138' as described with respect to method 100 apart from block 116A between block 116' and block 118'. After forming directional graph G (block 116'), block 116A of method 100' sets an initial maximum cumulative cost (MCOST) to MCOST=1, corresponding to a least acceptable path. Method 100' then proceeds to block 118' to start with the first path in the set.

At block 142', method 100' checks if all legs of the current path have been completed. If not, block 144' proceeds to the next leg of the current path, corresponding to block 144 of method 100. If the current path is complete, block 144A checks if the cumulative cost (CCOST) is less than the maximum cumulative cost (MCOST). If so, this would indicate the current path is more acceptable or more optimum than a previously found acceptable or optimum path, i.e., the current path minimizes the number of surfacings and travel distance compared to the previous acceptable path, while still satisfying the constraint on risk. Thus, the optimum path can be set to the current path (block 144B) and MCOST is set to the cumulative cost (CCOST) of the current path (block 144C). If CCOST is greater than MCOST, this indicates the current path is less optimum than the previously determined optimum path and can be discarded (returning to block 136'). Proceeding through all paths in this manner, method 100' ends with the optimum path.

It will be understood that many additional changes in details, materials and arrangements of parts which have been described herein and illustrated in order to explain the nature of the invention, may be made by those skilled in the art within the principle and scope of the invention as expressed in the appended claims.

What is claimed is:

1. A method for navigating an unmanned underwater vehicle according to a mission path with surfacing locations along said mission path from a given ingress point to a given goal point within an operational area, said method comprising:

mapping surface vessel traffic intensity onto said operational area;

identifying candidate surfacing locations based on said surfacing locations on said mapping where a void probability that there are no surface vessels within a specified radius of said surfacing locations while said unmanned underwater vehicle is surfaced for a specified duration is not less than a specified minimum safety value;

forming a directional graph of said candidate surfacing locations;

for each leg of each possible path through said candidate surfacing locations, determining a displacement of said traffic intensity based on an uncertainty in a state of an internal navigation system of said unmanned underwater vehicle over a distance traveled in said each leg;

for each said leg, determining a diminution in said void probability based on said displacement;

for each said possible path, determining a cumulative cost of each said leg in said path based on said distance traveled and said diminution;

determining an optimum path of all said possible paths based on said optimum path having a minimum cumulative cost; and navigating said unmanned underwater vehicle along the optimum path.

2. The method of claim 1, further comprising discarding a possible path when said void probability at one of said surfacing locations on said path is less than said minimum safety value.

3. The method of claim 1, wherein said mapping comprises estimating a Poisson intensity function based on a spatial point process of points in said operational area where said surface vessels are located.

4. The method of claim 1, wherein determining said optimum path further comprises discarding a possible path when a cumulative cost of said possible path exceeds a cumulative cost of a previous possible path.

5. The method of claim 1, wherein:
said inertial navigation system state is characterized by a symmetric Gaussian;
said uncertainty is characterized by a covariance matrix; and
determining said displacement comprises using said Gaussian as a probability density to displace said traffic intensity as a function of accumulated uncertainty in said state.

6. The method of claim 5, wherein determining said cost comprises determining an edge weight of said directional graph with said displacement for traversing said each leg as a ratio between said distance traveled and said void probability based on said displaced traffic intensity.

7. The method of claim 6, further comprising discarding a possible path when said void probability at one of said surfacing locations on said path is less than said minimum safety value.

8. The method of claim 7, wherein said mapping comprises estimating a Poisson intensity function based on a spatial point process of points in said operational area where said surface vessels are located.

9. The method of claim 8, wherein determining said optimum path further comprises discarding a possible path when a cumulative cost of said possible path exceeds a cumulative cost of a previous possible path.

10. A method of navigating an unmanned underwater vehicle having an inertial navigation system in an operational area between an ingress point to a goal point, said method comprising:
planning a path as a plurality of legs and surfacing locations between the ingress point and the goal point;
iteratively accumulating navigation uncertainty in a state of the internal navigation system of said unmanned underwater vehicle over each leg of the path between the surfacing locations, wherein an increase in said navigation uncertainty increases a cost associated with a risk of surfacing at a location with an elevated risk of collision with surface vessels;
specifying a safety radius about said unmanned underwater vehicle when surfaced;
specifying a duration said unmanned underwater vehicle remains surfaced;
defining a void probability as a probability that there are no surface vessels within said specified safety radius of a location while said unmanned underwater vehicle is surfaced for said specified duration, said void probability being inverse to said risk of surfacing;
constraining said risk of surfacing to a specified maximum value;
identifying candidate surfacing locations where said risk of surfacing is not greater than said specified maximum value, said all possible paths comprising each possible path through said candidate surfacing locations;
determining an optimum path of said all possible paths as the path having the lowest cost associated with the risk of surfacing; and
navigating said unmanned underwater vehicle along the optimum path.

11. The method of claim 10, wherein identifying candidate surfacing locations further comprises obtaining said void probability from an estimated Poisson function of traffic intensity over said operational area based on a spatial point process of points in said operational area where said surface vessels are located.

12. The method of claim 11, wherein iteratively accumulating further comprises:
determining a displacement of said traffic intensity for each leg of said each possible path based on said navigation uncertainty over a distance traveled in said each leg; and
for each said leg, determining said increase in said risk of surfacing based on said displacement.

13. The method of claim 12, further comprising defining said cost as a ratio between a distance traveled in said each leg and a displaced void probability of said displaced traffic density at an end of said each leg.

14. The method of claim 13, further comprising discarding a possible path when said void probability at one of said surfacing locations on said path exceeds said maximum value for said risk.

15. The method of claim 13, wherein the step of determining an optimum path of all possible paths is further based on said optimum path satisfying specified constraints on said risk and minimizing said cost, wherein minimizing said cost minimizes a number of said surfacing locations and minimizes a distance traveled between said ingress point and said goal point.

16. The method of claim 15, wherein determining said optimum path further comprises discarding a possible path when said void probability at one of said surfacing locations on said path exceeds said maximum value for said risk.

17. The method of claim 1 wherein the step of navigating further comprises the steps of:
moving the unmanned underwater vehicle along said optimum path;
surfacing the unmanned underwater vehicle at the identified candidate surfacing location along said optimum path;
obtaining a global positioning system fix while surfaced; and
resetting inertial navigation errors according to the obtained global positioning system fix.

* * * * *